United States Patent [19]

McCaully et al.

[11] 3,725,389
[45] Apr. 3, 1973

[54] ADDUCTS OF DELTA-AMINOBENZYLPENICILLIN AND N-SUBSTITUTED-4-PIPERIDONES

[75] Inventors: Ronald J. McCaully, Malvern; Stanley C. Bell, Penn Valley; George L. Conklin, Havertown, all of Pa.

[73] Assignee: American Home Products Corporation, New York, N.Y.

[22] Filed: July 2, 1971

[21] Appl. No.: 159,573

[52] U.S. Cl................................260/239.1, 424/271
[51] Int. Cl..............................................C07d 99/16
[58] Field of Search........................260/239.1, 240 C

[56] References Cited

UNITED STATES PATENTS 3,351,587  11/1967  Alburn et al. .....................260/239.1

Primary Examiner—Nicholas S. Rizzo
Attorney—Vito Victor Bellino et al.

[57] ABSTRACT

6-(Substituted-1,3,8-triazaspiro[4.5]decan-1-yl) penicillanic acids are described which exhibit antibacterial properties and whose solubility characteristics can be readily altered to permit wider versatility in their use as antibacterial agents.

7 Claims, No Drawings

ADDUCTS OF DELTA-AMINOBENZYLPENICILLIN AND N-SUBSTITUTED-4-PIPERIDONES

This invention relates to novel 6-(substituted-1,3,8-triazaspiro[4.5]decan-1-yl penicillanic acids.

One aspect of the present invention is to provide novel penicillanic acid derivatives exhibiting antibacterial activity and possessing chemical and physical properties that permit versatility in mode of administration.

Another aspect of the present invention is to provide N-substituted 6-(1,3,8-triazaspiro[4.5]decan-1-yl penicillanic acids in which the nitrogen substituent may be adjusted so as to impart to the product solubility characteristics which will affect absorption of the compound and break down rate to ampicillin.

A further aspect of the present invention relates to the preparation of the novelty products of the present invention.

The novel 6-(substituted-1,3,8-triazaspiro[4.5]decan-1-yl) penicillanic acids are represented by the structural formula

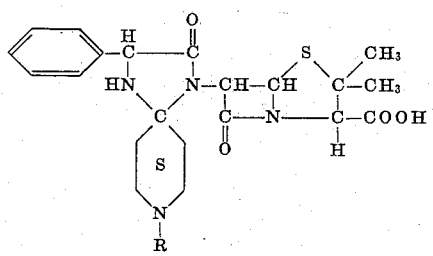

wherein R is a member selected from the class consisting of aroyl, ara(lower)alkyloxy carbonyl and $C_1$–$C_{14}$ hydrocarbon acyl. The term "lower alkyl" means a hydrocarbon radical having $C_1$ to $C_4$ carbon atoms (e.g. methyl, ethyl, propyl, butyl). The term "aroyl" means mono- and bicyclic hydrocarbons examplified by benzoyl and naphthoyl. The term "ara" means phenyl, naphthyl and substituted phenyl wherein the substituent is selected from the class consisting of (lower)alkyl having $C_1$–$C_6$ carbons, halogen (Cl, Br, F, etc.) and (lower)alkoxy having $C_1$–$C_6$ carbons. The term "hydrocarbon acyl" means both straight chain and branch chain radicals, either saturated or unsaturated as exemplified by acetyl, propionoyl, hexanoyl, octanoyl, decanoyl, t-butyroyl, dodecanoyl, tetradecanoyl, etc.

The compounds of formula I also include the corresponding non-toxic pharmaceutically acceptable salts such as (1) salts of the acidic carboxylic acid group, such as the sodium, potassium, calcium, aluminum and ammonium salts; amine salts; acid addition salts (i.e., salts of the basic nitrogen) exemplified by mineral acid addition, such as hydrochloride, sulfate, phosphate, sulfamate; organic acid addition, such as the maleate, acetate, citrate, oxalate, succinate, benzoate, malate, ascorbate, etc.

The compounds of the present invention are prepared by reacting α-aminobenzylpenicillin with an N-substituted-4-piperidone according to the equation:

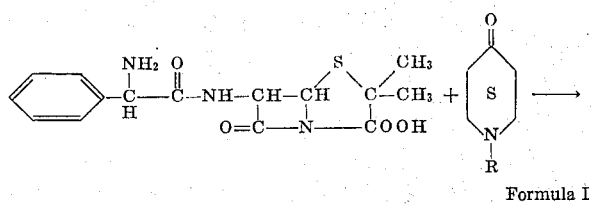

Formula I

The method of preparation of the compounds of formula I is carried out by stirring a solution of α-aminobenzylpenicillin and the appropriately N-substituted-4-piperidone in an inert solvent (e.g., chloroform, benzene, 1,2-dichloroethane, methylene chloride, etc.) in the presence of a tertiary lower alkyl amine (e.g. triethylamine) at a temperature between 20°–40 C. for 10–36 hours. This reaction may be run exposed to the atmosphere but is preferably carried out in an inert atmosphere. The reaction product is then isolated by aqueous extraction of the penicillin adduct-tertiary alkyl ammonium salt from the organic solvent followed by adjustment of the pH of the aqueous extract to pH 2–3 with dilute mineral acid (e.g. 1 to 5N) whereby the solid adduct separates from solution as white crystals.

In carrying out the foregoing process it is preferred to remove the excess tertiary (lower) alkyl amine prior to aqueous extraction by evaporation in vacuo of the inert organic solvent and excess solvent. The residue is then redissolved in the organic solvent and extracted with water as previously described. Final isolation of the product may also be facilitated if the aqueous solution is chilled and the acid neutralization is carried out step-wise. The solution is adjusted to pH 7, seeded and filtered from unaltered α-aminobenzyl-penicillin. The process may be repeated at pH 5 to remove additional unaltered α-aminobenzylpenicillin.

Depending on the nature of the R substituent in formula I the solubility properties of some of the products embraced by such formula is such that they will not separate from aqueous solution in the pH range of 2–3 and they must therefore be isolated by lyophilization of the aqueous solution. Therefore, it is necessary that the tertiary (lower)alkylamine hydrochloride and unaltered α-aminobenzyl-penicillin be removed when the product of formula I is isolated by lyophilization.

The N-substituted-4-piperidones used to prepare the products of the present invention may be prepared in accordance with the procedures described by Mc Elvain et al. in *J. Am. Chem. Society*, 71, 901 (1949) and H. H. Kuehnis, is, H. Rfy and R. Denss, Swiss Pat. No. 447,163, Mar. 1968 the disclosure of which is incorporated herein by reference.

The following examples are illustrative of the products and processes of the present invention.

EXAMPLE 1

6-(8-Benzoyl-2-Oxo-3-Phenyl-1,3,8Triazaspiro [4.5]Decan-1-yl)Penicillanic Acid

A solution of 5.0 g. of α-aminobenzylpenicillin and 2.9 g. of N-benzoyl-4-piperidone in 100 ml. of methylene chloride and 3.0 g. of triethylamine are stirred at 26° for 24 hours in a nitrogen atmosphere. The cloudy solution is filtered through filter-cell and poured into icewater. The two phase mixture is thoroughly agitated and the aqueous phase separated. Gradual acidification of the aqueous phase with 3N hydrochloric acid to pH 2.5 afforded 1.1 g. of above-titled product.

Analysis: Calculated for $C_{28}H_{30}N_4O_5S \cdot 1\frac{1}{2}H_2O$: C,59.87; H,5.92; N, 9.98

Found: C,59.87; H,5.54; N,10.05

IR spectrum (KBr) exhibited bands at 5.64 ($\beta$-lactam), 5.90 (broad) and 6.21 (broad).

EXAMPLE 2

6-(8-Acetyl-2-Oxo-3-Phenyl-1,3,8-Triazaspiro [4.5]Decan-1-yl)Penicillanic Acid

A solution of 5.0 g. of $\alpha$-aminobenzylpenicillin and 2.0 g. of N-acetyl-4-piperidone in 100 ml. of methylene chloride and 3.0 g. of triethylamine are stirred at 26° for 24 hours in a nitrogen atmosphere. The solution is extracted with two portions of water. The combined aqueous extracts are acidified to pH 2.0 and the sticky, amorphous solid that separated is filtered. The filtrate is freeze dried to a white powder and the powder is slurried two times in 12 ml.-portions of water. The small quantity of undissolved solid is dissolved in 180 ml. of water and freeze dried to 400 mg. of the above-titled product.

Analysis: Calculated for $C_{23}H_{28}N_4O_5S \cdot 2\frac{1}{2} H_2O$: C,53.37; H,6.42; N,10.82

Found: C,52.84; H,5.97; N,10.92

The IR spectrum exhibited bands at 5.63 ($\beta$-lactam), 5.88(broad) and 6.21 (broad).

EXAMPLE 3

6-(8-Carboxy-2-Oxo-3-Phenyl-1,3,8-Triazaspiro-[4.5]Decan-1-yl)Penicillanic Acid, 6-Benzyl Ester A solution of 5.0 g. of $\alpha$-aminobenzylpenicillin and 3.3 g. of N-carbobenzyloxy-4-piperidone in 100 ml. of methylene chloride and 3.0 g. of triethylamine are stirred at 26° for 24 hours in a nitrogen atmosphere. The solvent and excess triethylamine are evaporated in vacuo at room temperature and the oily residue is dissolved in 100 ml. of cold water. The water is extracted with ether and then acidified to pH 6.8–7.0 with 3 N hydrochloric acid. The unaltered $\alpha$-aminobenzylpenicillin separated out and is filtered off. The filtrate is acidified with 3 N hydrochloric acid to pH 2.5 whereupon 1.1 g. of the above-titled product is obtained.

Analysis: Calculated for $C_{29}H_{32}N_4O_6S \cdot H_2O$: C, 59.78; H, 5.88; S, 5.50

Found: C, 59.76; H, 5.71; S, 5.39

The IR spectrum of the product exhibited bands at 5.64 ($\beta$-lactam) and 5.96 (broad).

EXAMPLE 4

The condensation of $\alpha$-aminobenzylpenicillin and N-carbo-benzyloxy-4-piperidone (in 50 percent molar excess) is carried out as described in Example 3. The yield of 6-(8-carboxy-2-oxo-3-phenyl-1,3,8-triazaspiro-[4.5]decan-1-yl) penicillanic acid, 6-benzyl ester was unaffected by the excess N-carbobenzyloxy-4-piperidone.

EXAMPLE 5

6-(8-Octanoyl-2-Oxo-3-Phenyl-1,3,8-Triazaspiro [4.5]Decan-1-yl)-Penicillanic Acid A solution of 5.0 g. of $\alpha$-aminobenzylpenicillin and 3.2 g. of N-octanoyl-4-piperidone in 100 ml. of methylene chloride and 3.0 g. of triethylamine are stirred at 26° for 24 hours under nitrogen atmosphere. The solvent and excess triethylamine are evaporated in vacuo. The residue is dissolved in 100 ml. of cold water and the solution is extracted with ether containing a small quantity of heptane. The aqueous phase is adjusted to pH 6.8 and seeded with $\alpha$-aminobenzylpenicillin. After filtration of the unaltered $\alpha$-aminobenzylpenicillin (2.8 g.), the filtrate is acidified to pH 4.7 and refiltered from a small quantity of sticky gum by passage through a filter-cell cake. Upon acidification of the filtrate to pH 2.7, 0.7 g. of the above-titled product separated.

Analysis: Calculated for $C_{29}H_{40}N_4O_5S \cdot H_2O$: C, 60.60; H, 7.36; N, 9.75; S,5.58

Found: C, 60.78; H, 7.25; N, 9.79; S,5.72

The IR spectrum of the product had bands at 5.62 ($\beta$-lactam), 5.86 (CO) and 6.15–6.30 (broad).

EXAMPLE 6

When in the procedure of Example 1, the N-benzoyl-4-piperi-done is replaced by
1. N-hexanoyl 4-piperidone
2. N-tetradecanoyl 4-piperidone
respectively, the following corresponding penicillin adducts are produced:
1. 6-(8-hexanoyl-2-oxo-3-phenyl-1,3,8-triazaspiro[ 4.5]decan-1-yl) penicillanic acid
2. 6-(8-tetradecanoyl-2-oxo-3-phenyl-1,3,8-triazaspiro[4.5]decan-1-yl)penicillanic acid.

The compounds of formula I of this invention have been found to possess antibacterial activity. Antibacterial screening is carried out by an agar serial dilution technique. Distilled water is used as a vehicle. The stock solution is prepared at 10,000 $\mu$g./ml. of substance in the vehicle. Two-fold dilutions are made with sterile water. One ml. quantities of each dilution are incorporated into 9 ml. seed agar in sterile petrie dishes. The hardened surface is inoculated with test organisms and incubated 18 hours at 35° C. The end point is reported as a minimal inhibitory concentration (MIC) expressed in $\mu$g./ml.; the least amount of test substance that will completely inhibit the test organism.

The following table is illustrative of the antibacterial properties of the compounds of the present invention:

| Compound of Example | Test Organism | MIC g./ml. |
|---|---|---|
| 1 | Bacillus subtilis 6633 | 0.244 |
| 2 | Bacillus subtilis 6633 | 0.244 |
| 3 | Bacillus subtilis 6633 | 0.122 |
| 1 | Escherichia coli 6880 | 3.90 |
| 2 | Escherichia coli 6880 | 7.81 |
| 3 | Escherichia coli 6880 | 1.95 |
| 1 | Staphylococcus aureus 6538 P | 0.244 |
| 2 | Staphylococcus aureus 6538 P | 0.488 |
| 3 | Staphylococcus aureus 6538 P | 0.244 |
| 1 | Staphylococcus aureus CHP | 62.5 |
| 2 | Staphylococcus aureus CHP | 62.5 |
| 3 | Staphylococcus aureus CHP | 31.3 |

The foregoing examples of antibacterial activity are merely given to illustrate the utility of the compounds of the present invention and such compounds have demonstrated antibacterial activity against other test organisms.

The in vivo antibacterial activity of the compounds of the present invention has been substantiated in mice. The compound of Example 1 exhibits upon subcutaneous administration in mice an $ED_{50}$ against streptococcus pyogenes C203 of 0.42 mg. per kg. The compound of Examples 2 and 3 gave a $ED_{50}$ against the same organism of 0.425 and 0.393 mg./kg. respectively, as determined by the method of Reed and Muench, *American Journal of Hygiene*, 27, 493 (1938).

The compounds of this invention have been designed to breakdown gradually to ampicillin so that the ampicillin activity would be of a longer duration. The rate of breakdown would be affected by the size of the R-group. Alterations in the R-group also cause changes in the hydrophilic and lipophilic properties of the compounds. Changes in these properties could be expected to alter the selective absorption of the compounds at various sites in the body.

The above alterations in the properties of the compound would be especially important when the compounds are administered intramuscularly as a depot injection. For a depot injection the medium could be varied so that the compounds are dissolved or in suspension.

Unlike the previous derivatives of ampicillin (namely the hetacillin family) the compounds of this invention permit more facile and greater variations in the physical properties of the penicillins without introducing the complications that accompany the addition of new chiral centers.

What is claimed is:

1. A compound selected from the class consisting of those having the formula

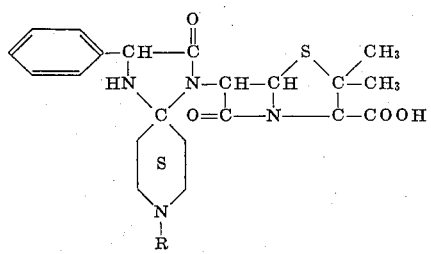

wherein R is a member selected from the class consisting of benzoyl, naphthoyl, $C_1$–$C_{14}$ hydrocarbon acyl, phenyl(lower)alkyloxycarbonyl, naphthyl(lower)alkyloxycarbonyl and substituted phenyl(lower)alkyloxycarbonyl, said substituent being selected from the class consisting of $C_1$–$C_6$ alkyl, halo and $C_1$–$C_6$ alkoxy; and the non-toxic addition salts thereof.

2. The compound of claim 1 which is 6-(8-benzoyl-2-oxo-3-phenyl-1,3,8-triazaspiro[4.5]decan-1-yl)penicillanic acid.

3. The compound of claim 1 which is 6-(8-acetyl-2-oxo-3-phenyl-1,3,8-triazaspiro[4.5]decan-1-yl)penicillanic acid.

4. The compound of claim 1 which is 6-(8-carboxy-2-oxo-3-phenyl-1,3,8-triazaspiro[4.5]decan-1-yl)penicillanic acid, 6-benzyl ester.

5. The compound of claim 1 which is 6-(8-octanoyl-2-oxo-3-phenyl-1,3,8-triazaspiro[4.5]decan-1-yl)penicillanic acid.

6. The process for preparing a compound selected from the group consisting of those having the formula:

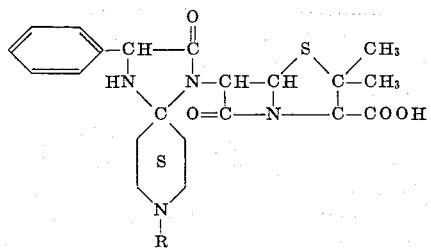

wherein R is a member selected from the class consisting of benzoyl, naphthoyl, $C_1$–$C_{14}$ hydrocarbon acyl, phenyl(lower)alkyloxycarbonyl, naphthyl(lower)alkoxy carbonyl, and substituted phenyl(lower)alkyloxycarbonyl, said substituent being selected from the class consisting of $C_1$–$C_6$ (alkyl, halo and $C_1$–$C_6$ alkoxy; which comprises reacting α-aminobenzyl penicillin with a compound of the formula

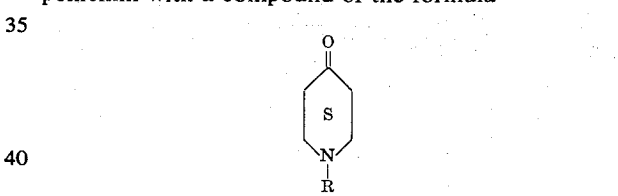

in the presence of an inert organic solvent and a trialkylamine, said reaction being carried out at a temperature between about 20° and about 40° C.

7. A process according to claim 6 wherein said reaction is carried out in an inert atmosphere.

* * * * *